United States Patent Office.

CARL ANTON JOHANNES HUGO SCHROEDER, OF LONDON, ENGLAND.

CARBON FOR ELECTRIC LIGHTING.

SPECIFICATION forming part of Letters Patent No. 408,358, dated August 6, 1889.

Application filed May 15, 1888. Serial No. 273,979. (No specimens.) Patented in England April 26, 1888, No. 6,191; in Germany May 12, 1888, No. 47,490; in France May 29, 1888, No. 190,789, and in Belgium June 23, 1888, No. 82,308.

*To all whom it may concern:*

Be it known that I, CARL ANTON JOHANNES HUGO SCHROEDER, a subject of the Queen of Great Britain, residing at 17 Althorpe Road, Upper Tooting, London, S. W., England, have invented a Mode of Preparing Carbons for Electric Lighting, (for which I have received English patent, No. 6,191, of April 26, 1888, this being granted unto me during August, 1888; French patent, No. 190,789, of May 29, 1888, this being granted unto me on the 1st August, 1888; Belgian patent, No. 82,308, Division Litt. D, of June 23, 1888, this being granted unto me on the 16th July, 1888; German patent, No. 47,490, of May 12, 1888, this being granted unto me on the 12th January, 1889,) of which the following is a specification.

Carbons to be prepared by my mode may have any kind of structure, from the densest to the loosest, and may be of any degree of hardness. The preparation is adapted to the properties of the carbons, as follows:

I. Dense carbon is first dipped into a dilute solution of calcic chloride, so that the carbon is moderately saturated, after which it is taken out of the solution and left to dry. After it is dry it is ready for use.

II. Carbon of loose structure is likewise first dipped into a dilute solution of calcic chloride, and remains therein until the carbon is moderately saturated, after which it is taken out of the solution. The carbon is then brought, whether dry or not, into a bath of a solution of potassic chlorate, or potassic nitrate, or sodic nitrate, or any other potassium or sodium compound which is soluble in water, or any composition of such salt solutions, in which solution the carbon must remain for a time, according to its density, hardness, and other properties. It is preferable to apply this solution concentrated as well as hot or at a boiling temperature. After the carbon is taken out of this bath the carbon is exposed to heated air in such a manner that the carbon first dries and then gets considerably hot. The carbon is now brought in this hot condition into a bath of fused potassic nitrate, or sodic nitrate, or potassic chlorate, or any other potassium or sodium compound which is soluble in water. The bath of these fused salts or their composition is situated in a vessel made of suitable material, such as iron, porcelain, platinum, &c. The carbon must remain in the bath until the carbon is either completely or partly penetrated by the salts, the amount of penetration depending on the electro-motive force of the current for which the carbon is to be used. It is good to give the carbon in the vessel a swinging motion during this manipulation, so as to let the preparation act as uniformly on the carbon as possible. When the carbon is taken out of this bath, it is, while still hot, wiped with a piece of asbestus or any other suitable appliance in order to remove the excess of the salts adhering to the carbon. The carbon is now ready for use; but it is preferable to remove the outer layer by mechanical or other suitable means on that part of the carbon where the current has to pass.

*Mode of applying the carbons in the way prepared as described.*—Carbons prepared in these two different ways may be used or burned in various ways. The following is the most to be recommended: The carbon of the preparation No. I—namely, the carbon of dense structure—is preferably employed of a smaller diameter than the carbon of the preparation No. II, and is taken as the negative pole, generally situated below, while the carbon of the preparation No. II—namely, the looser carbon of larger diameter, that may consist of one or more pieces—is to be applied to the positive pole, generally situated at the top.

Having fully described my invention, what I desire to claim and secure by Letters Patent is—

The process of treating carbon electrodes for arc lights, which consists in first impregnating the carbons with a dilute solution of calcic chloride and then treating the same with a potassium compound which is soluble in water or its described equivalents, this being done partly with wet solutions, but principally with fused materials, as set forth.

In testimony whereof I have signed my name to this specification, in the presence of two subscribing witnesses, the 27th day of April, 1888.

CARL ANTON JOHANNES HUGO SCHROEDER.

Witnesses:
 FRANCIS W. FRIGOUT,
 E. A. LEOPOLD,
*Consulate-General U. S. A., London, England.*